US012597217B2

(12) United States Patent
Manila et al.

(10) Patent No.: US 12,597,217 B2
(45) Date of Patent: Apr. 7, 2026

(54) METHODS AND SYSTEMS FOR AUGMENTED REALITY IN AUTOMOTIVE APPLICATIONS

(71) Applicant: VALEO COMFORT AND DRIVING ASSISTANCE, Créteil (FR)

(72) Inventors: Anushalakshmi Manila, San Mateo, CA (US); Sonam Negi, San Mateo, CA (US)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 216 days.

(21) Appl. No.: 18/340,628

(22) Filed: Jun. 23, 2023

(65) Prior Publication Data

US 2024/0428526 A1  Dec. 26, 2024

(51) Int. Cl.
| | |
|---|---|
| *G06T 19/00* | (2011.01) |
| *B60K 35/00* | (2024.01) |
| *G06T 7/12* | (2017.01) |
| *G06V 10/70* | (2022.01) |
| *G06V 20/20* | (2022.01) |
| *G06V 20/58* | (2022.01) |
| *G06V 20/70* | (2022.01) |
| *B60K 35/22* | (2024.01) |
| *B60K 35/28* | (2024.01) |

(52) U.S. Cl.
CPC ........... *G06T 19/006* (2013.01); *B60K 35/00* (2013.01); *G06T 7/12* (2017.01); *G06V 10/70* (2022.01); *G06V 20/20* (2022.01); *G06V 20/58* (2022.01); *G06V 20/70* (2022.01); *B60K 35/22* (2024.01); *B60K 35/28* (2024.01); *B60K*

*2360/177* (2024.01); *B60K 2360/21* (2024.01); *G06T 2200/24* (2013.01); *G06T 2207/20081* (2013.01); *G06T 2207/20084* (2013.01); *G06T 2207/30252* (2013.01)

(58) Field of Classification Search
CPC .............. G06T 19/006; G06T 2200/24; G06T 2207/20081; G06T 2207/20084; G06V 10/70; G06V 20/20; G06V 20/58; G06V 20/70
See application file for complete search history.

(56) References Cited

U.S. PATENT DOCUMENTS

| | | | |
|---|---|---|---|
| 2017/0324943 A1* | 11/2017 | Wu | ........................... B60R 1/27 |
| 2019/0355178 A1 | 11/2019 | Hermina Martinez et al. | |
| 2021/0374965 A1* | 12/2021 | Richter | ................... G06N 3/08 |

(Continued)

OTHER PUBLICATIONS

International Search Report issued in corresponding International Application No. PCT/US2024/034772 mailed Sep. 10, 2024 (5 pages).

(Continued)

*Primary Examiner* — Grace Q Li

(74) *Attorney, Agent, or Firm* — Osha Bergman Watanabe & Burton LLP

(57) ABSTRACT

A method for augmented reality in automotive applications involves obtaining an image frame from a camera of a motor vehicle, identifying at least one environmental object in the image frame, determining an augmentation content based on the at least one environmental object, rendering an augmented image frame based on the image frame and the augmentation content, and displaying the augmented image frame to a user.

18 Claims, 8 Drawing Sheets

(56) References Cited

U.S. PATENT DOCUMENTS

| | | | | |
|---|---|---|---|---|
| 2022/0048429 A1* | 2/2022 | Verbeke | ................. | B60Q 1/507 |
| 2022/0153279 A1* | 5/2022 | Atsmon | ................. | G08G 1/162 |
| 2023/0318992 A1* | 10/2023 | He | ........................... | G06F 40/30 |
| 2023/0368458 A1* | 11/2023 | Dryer | ....................... | G06T 15/50 |
| 2023/0415652 A1* | 12/2023 | Wada | ........................ | B60R 1/25 |
| 2024/0070996 A1* | 2/2024 | Gurgul | ................... | G06V 20/20 |
| 2024/0386586 A1* | 11/2024 | Degirmenci | .............. | G06T 7/50 |

OTHER PUBLICATIONS

Written Opinion issued in corresponding International Application No. PCT/US2024/034772 mailed Sep. 10, 2024 (9 pages).
Togwell Henry et al: "In-cAR Gaming: Exploring the use of AR headsets to Leverage Passenger Travel Environments for Mixed Reality Gameplay", CHI Conference on Human Factors in Computing Systems, ACM, New York, NY, USA, Apr. 27, 2022 (Apr. 27, 2022), pp. 1-7, XP058798642, DOI: 10.1145/3491101.3519741 ISBN: 978-1-4503-9157-3 pp. 1-4 (7 pages).
Qian et al. "Survery on Fish-Eye Cameras and Their Applications in Intelligent Vehicles." IEEE Transactions on Intelligent Transportation Systems, vol. 23, No. 12, Dec. 2022. pp. 22755-22771. (17 pages).
Chiu et al. "Augmented Reality Driving Using Semantic Geo-Registration." 2018 IEEE Conference on Virtual Reality and 3D User Interfaces 18-22 March, Reutlingen, Germany, 978-1-5386-3365-6/18/$31.00 © 2018 IEEE. pp. 423-430 (8 pages).
Anonymous. "Valeo unveils in-car XR racing game at SXSW." Unity Technologies, Apr. 19, 2024. pp. 1-6 (6 pages).
Screenshot—"Carcade—A project by Andreas Nicolas Fischer, Martin Kim Luge and Korbinian Polk." Universitat-der Kunste Berlin. The Wayback Machine—https://web.archive.org/web/20081209105159/http://www.digital.udk-berlin.de:80/en/projects/winter0708/haupt/incargaming/carcad . . . (1 page).

* cited by examiner

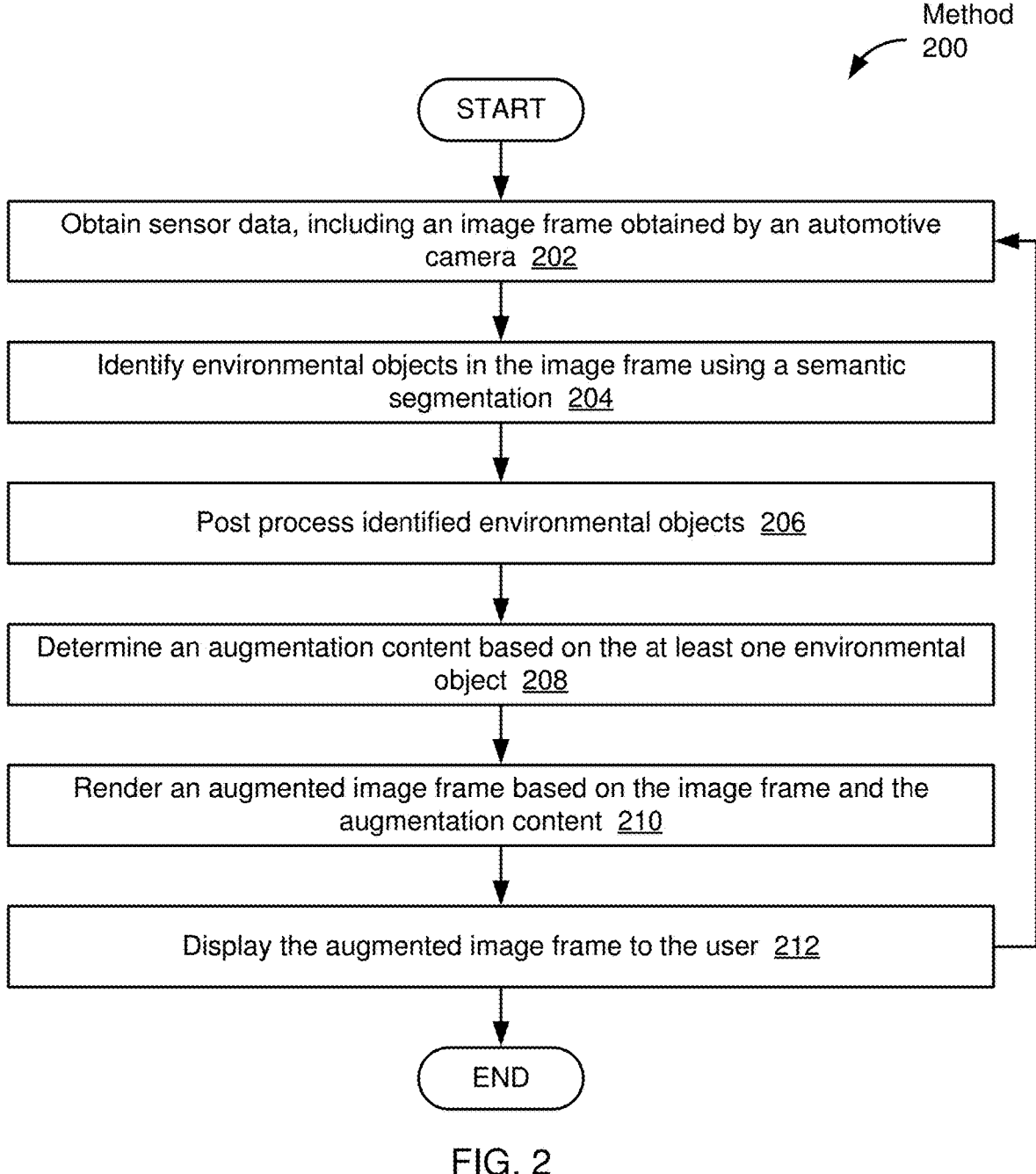

Method 200

START

Obtain sensor data, including an image frame obtained by an automotive camera 202

Identify environmental objects in the image frame using a semantic segmentation 204

Post process identified environmental objects 206

Determine an augmentation content based on the at least one environmental object 208

Render an augmented image frame based on the image frame and the augmentation content 210

Display the augmented image frame to the user 212

END

FIG. 2

Example Screenshot
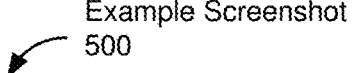
500
FIG. 5

METHODS AND SYSTEMS FOR AUGMENTED REALITY IN AUTOMOTIVE APPLICATIONS

BACKGROUND

Motor vehicles are increasingly equipped with numerous sensors. Such sensors include, for example, cameras, LIDAR sensors, ultrasonic sensors, etc. These sensors may support driver assistance systems and/or implementations of autonomous driving. Other applications may benefit from the availability of signals obtained from these sensors. With the availability of signals provided by these sensors, other applications, e.g., applications that are traditionally not directly receiving such signals may be feasible.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for augmented reality in automotive applications, the method comprising: obtaining an image frame from a camera of a motor vehicle; identifying at least one environmental object in the image frame; determining an augmentation content based on the at least one environmental object; rendering an augmented image frame based on the image frame and the augmentation content; and displaying the augmented image frame to a user.

In general, in one aspect, embodiments relate to a system for augmented reality in automotive applications, the system comprising: an environment interpretation engine that identifies at least one environmental object in an image frame obtained from a camera of a motor vehicle; a content augmentation engine that determines an augmentation content based on the at least one environmental object; and a rendering engine that renders an augmented image frame based on the image frame and the augmentation content for display of the augmented image to a user.

In general, in one aspect, embodiments relate to a non-transitory computer readable medium (CRM) storing computer readable program code for augmented reality in automotive applications, wherein the computer readable program code causes a computer system to: obtain an image frame from a camera of a motor vehicle; identify at least one environmental object in the image frame; determine an augmentation content based on the at least one environmental object; render an augmented image frame based on the image frame and the augmentation content; and display the augmented image frame to a user.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIG. 2 shows a method for augmented reality in automotive application, in accordance with one or more embodiments.

FIG. 5 shows an example in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for augmented reality in automotive applications. Virtual reality (VR) and augmented reality (AR) are increasingly used in entertainment, education, monitoring and supervision, control, and other applications. VR and AR applications frequently require input from sensors such as, for example, cameras. In one or more embodiments of the disclosure, a platform is provided that leverages the sensors of a motor vehicle to provide VR and AR applications to users of the motor vehicle. For passengers, these applications may provide entertainment and/or information-type content. For drivers, these applications may provide information and/or assistive-type content. An example of an AR application in accordance with embodiments of the disclosure is a video game that relies on image frames obtained using a camera associated with the motor vehicle to provide real-world, real-time content in the video game. These and other applications and the underlying platform in accordance with embodiments of the disclosure are subsequently discussed in reference to the figures.

Figure 1A:
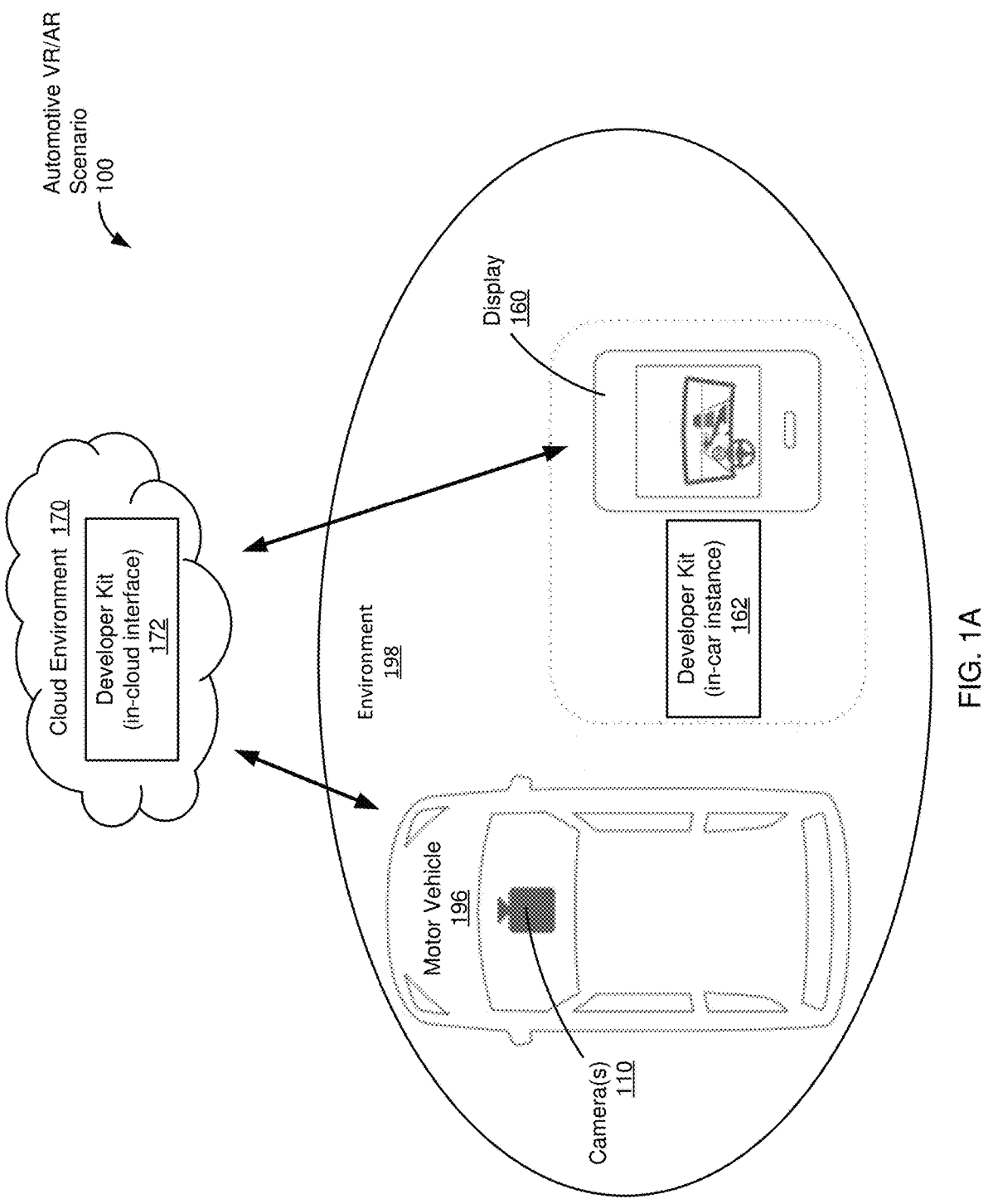
FIGS. 1A and 1B show automotive augmented reality (AR)/virtual reality (VR) scenarios, in accordance with one or more embodiments.
Figure 1B:
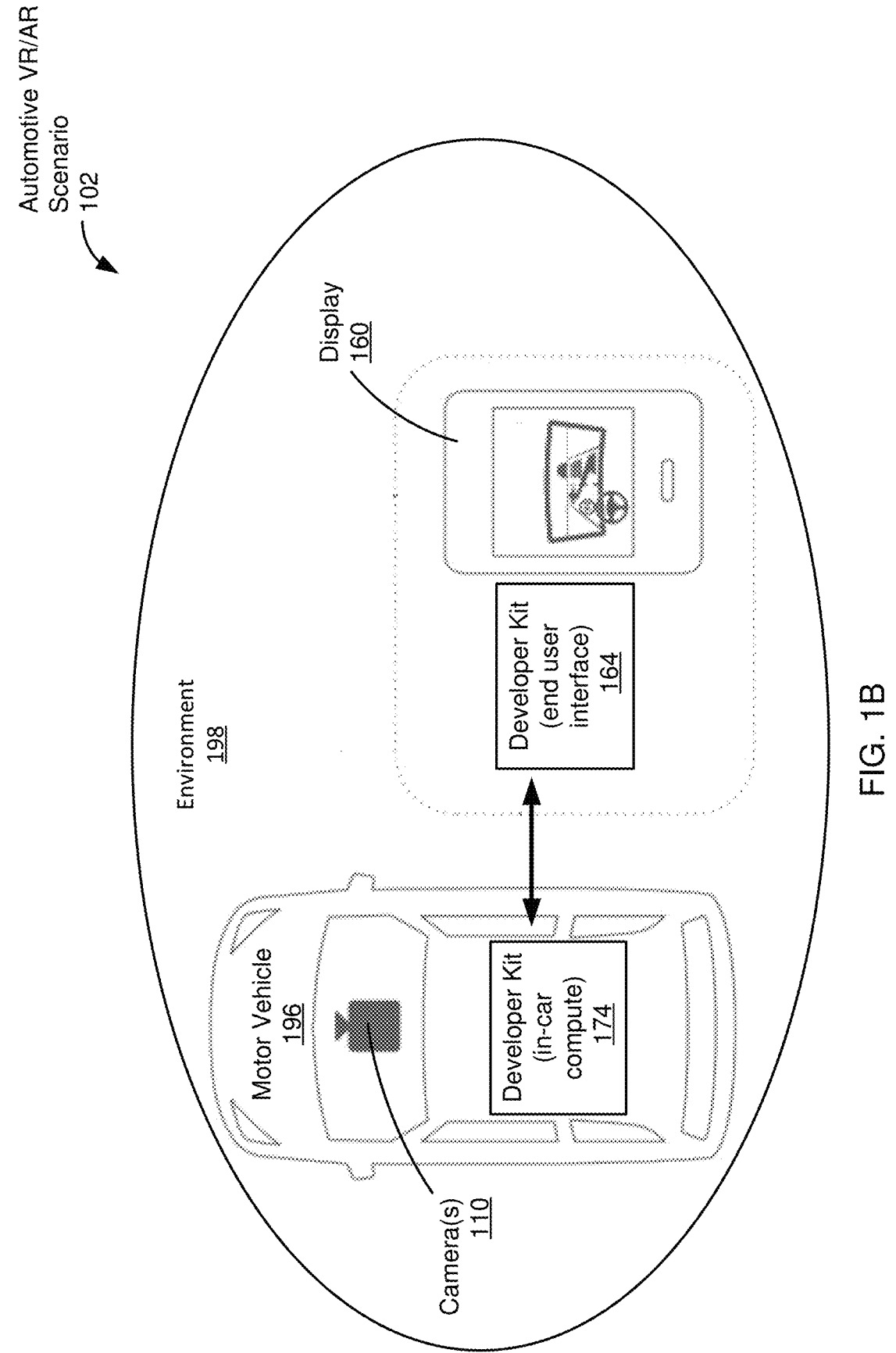

FIGS. 1A and 1B schematically show automotive AR/VR scenarios (100), in accordance with one or more embodiments. While FIG. 1A shows a scenario that includes cloud-based components, FIG. 1B shows a scenario that does not necessarily require cloud-based components.

Turning to FIG. 1A, in scenario (100) as shown, a motor vehicle (196) is in an environment (198). The motor vehicle may be, for example, a passenger car, a bus, or any other type of vehicle. A driver and/or passengers may be present in the motor vehicle. The environment (198) is an environment surrounding the motor vehicle. In a typical scenario, the environment (198) may include elements such as, for example, roads, other traffic including other vehicles, pedestrians, buildings, etc. The motor vehicle (196) may move in the environment (198). Accordingly, the environment (198) may be non-stationary relative to the motor vehicle (196).

In one or more embodiments, the motor vehicle is equipped with one or more camera(s) (110). The one or more cameras (110) capture image frames of the environment (198). These image frames may be processed and may be displayed on a display (160). The display (160) may be a display of a portable user device such as a smartphone or a tablet. In one or more embodiments, the image frames are augmented prior to displaying on the display (160). The type of augmentation may depend on the application. For example, a video game may include different element than an educational application. A detailed discussion is provided below in reference to FIG. 1C describing a system (190) and FIGS. 2 and 3 describing methods (200, 300).

In the scenario (100), the exchange of image frames (e.g., from the camera(s) (110) to the display (160)) may be performed via the cloud environment (170). The augmentation and/or other operations may be performed in the cloud environment (170). Additional details are provided below in reference to FIG. 1C and the flowcharts of FIGS. 2 and 3.

In one or more embodiments, a developer kit that includes an in-cloud interface (172) and an in-car instance (162) is provided to facilitate the development of possible AR/VR applications. The developer kit may include tools for processing the image frames and/or other sensor data, obtained in either raw or pre-processed form. The developer kit may further provide a developer interface for developers and/or users to access the image frames and/or other sensor data for further use (e.g., by a game engine). Developer interfaces may be provided in the form of one or more application programming interfaces (APIs). APIs may exist, for example, to provide access to sensor data such as image frames obtained from the camera(s), Lidar data, the speed of the vehicle, the steering angle, global positioning system (GPS) data, inertial measurement unit (IMU) data, etc. APIs may further exist for a 3D development space, and for the rendering of a 2.5D output. The APIs may provide access to any of the functionalities as subsequently described.

The developer interface may be standardized for straightforward access to these data for a wide variety of applications using the data. The developer interface may provide access not only to the data obtained from the camera(s) (110) and/or other sensors, but also to data that are a result of machine learning-based processing of these data, e.g., as described in reference to the flowcharts of FIGS. 2 and 3. The developer kit may allow a third party, e.g., an application developer, to provide content for execution on the system as further described in reference to FIG. 1. The availability of data in a standardized format through the developer kit may simplify the task of developing applications and may enable non-experts to become VR/AR content generators.

In the embodiments as shown in FIG. 1A, the in-cloud interface (172) is the component of the development kit that may be accessible by an application developer, e.g., for testing, deployment, etc. of an application. The in-car instance (162) is the component of the development kit that executes locally, e.g., on a user input device or a display device. The in-car instance (162) may gather user input commands, may perform operations associated with the visualization of the content to be displayed to the user, and/or may also execute the application.

Turning to FIG. 1B, in the scenario (102) as shown, a motor vehicle (196) is in an environment (198). The scenario (102) is similar to the scenario (100) but does not rely on a cloud environment. A developer kit in scenario (102) includes an in-car compute (174) and an end-user interface (164). The in-car compute (174) and the end user interface (164) may be functionally equivalent to the in-cloud interface (172) and the in-car-instance (162), respectively, although in a local implementation without cloud processing. Periodic communication with other remote (e.g., cloud-based components) may be limited to, for example, downloading of an application, servicing of an application, etc.

Figure 1C:
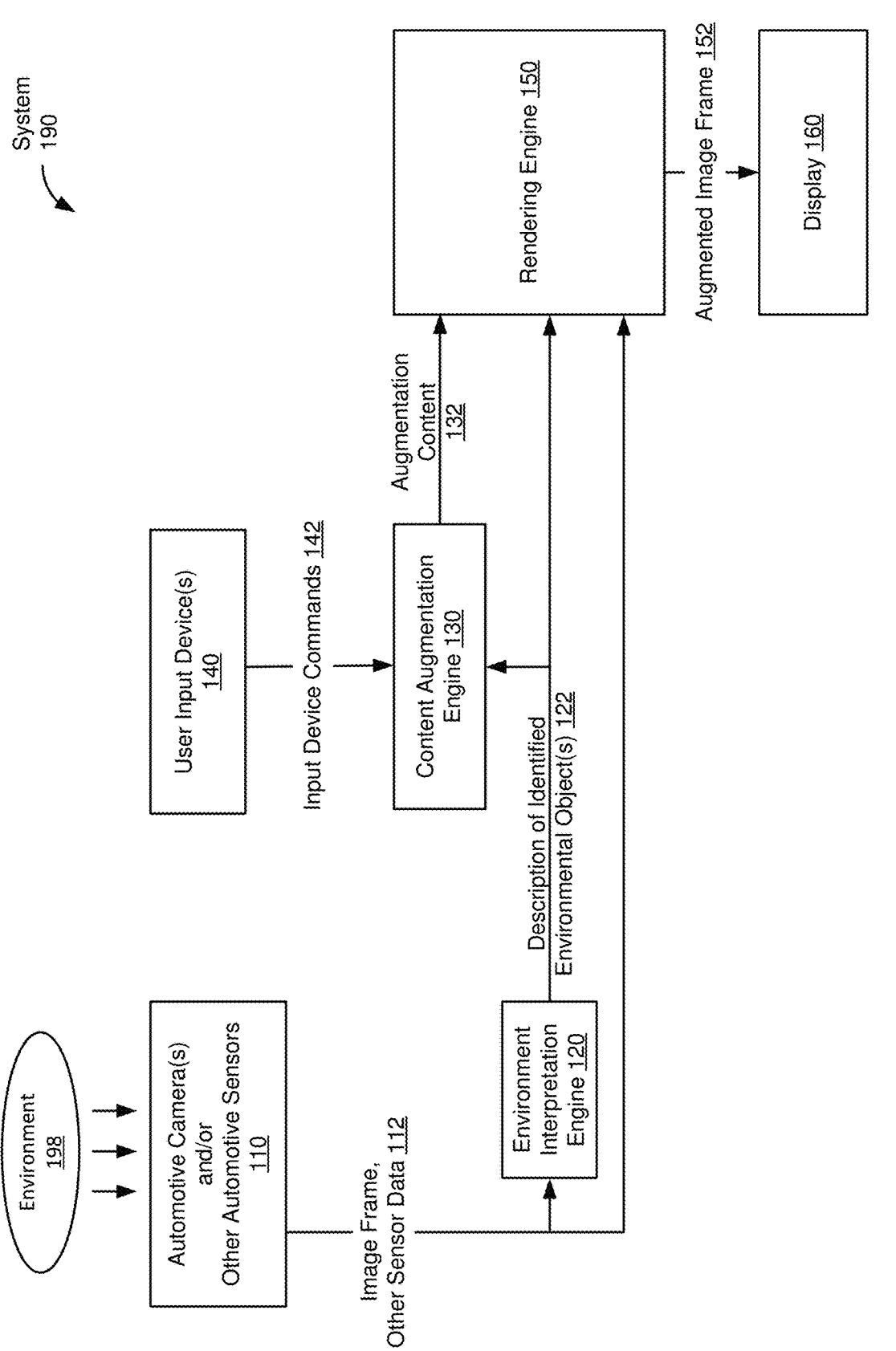
FIG. 1C shows a system for augmented reality in automotive applications, in accordance with one or more embodiments.

FIG. 1C is a block diagram of a system (190) for augmented reality in automotive applications, in accordance with one or more embodiments. In one or more embodiments, the system (190) is associated with a motor vehicle (196). For example, one or more elements of the system (190) may be components of the motor vehicle, the system (190) may be used by a user of the motor vehicle (e.g., a passenger and/or a driver), etc. Specific scenarios are described below.

The system includes one or more cameras and/or other sensors (110), an environment interpretation engine (120), a content augmentation engine (130), a rendering engine (150), and a display (160). The system may further include one or more user input devices (140). Each of these components is subsequently described.

The one or more cameras and/or other sensors (110) capture data from the environment (198). The camera(s) (110) may capture image frames of the environment (198). Image frames may be captured repeatedly at a fixed or adjustable frame rate. The camera(s) (110) may be of any type, may have any field of view, resolution, orientation, etc. In one embodiment, a fisheye camera is used. Data from the camera(s), e.g., image frames, may be provided in any format (e.g., representing RGB pixel values) and may be received by an electronic control unit (ECU) of the motor vehicle. The ECU may include components for a hardware-accelerated video processing, including machine learning based video processing. The ECU may further execute various components of the system (100), e.g., the environment interpretation engine (120), the content augmentation engine (130), and/or the rendering engine (150).

Other sensors of the motor vehicle may include, for example, GPS and/or IMU sensors for location and/or orientation tracking, including mapping and localization, determination of vehicle speed, acceleration, etc. The other sensors may further include Lidar, Radar, and/or ultrasonic sensors, etc., e.g., as used for driver-assistive functionality.

The one or more cameras and/or other sensors (110) may provide an image frame, or more generally, sensor data (112). The sensor data (112) may be provided in any form, and may depend on the type of sensor. For example, a camera may provide an image frame, whereas a steering angle sensor may provide a value reflecting a measurement of the steering angle.

In one or more embodiments, the sensor data or image frame (112) may be preprocessed, as further described below in reference to the flowcharts.

The environment interpretation engine (120), in one or more embodiments, receives the sensor data (112), e.g., in the form of an image frame, and identifies environmental objects (122) in the image frame. For example, the road, pedestrians, other vehicles, buildings, etc., may be identified in the image frame. The environment interpretation engine (120) may perform methods of image processing in order to identify the environmental objects (122). Any type of image processing may be used. For example, the image processing may use machine learning-based algorithms.

Machine learning (ML), broadly defined, is the extraction of patterns and insights from data. The phrases "artificial intelligence", "machine learning", "deep learning", and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning, or machine-learned, will be adopted herein. However, one skilled in the art will recognize that the concepts and methods detailed hereafter are not limited by this choice of nomenclature.

Machine learned model types as used herein for video processing, and for processing image frames may include, but are not limited to, generalized linear models, Bayesian regression, random forests, and deep models such as neural networks, convolutional neural networks, and recurrent neural networks. Machine learned model types, whether they are considered deep or not, are usually associated with additional "hyperparameters" which further describe the model. For example, hyperparameters providing further detail about a neural network may include, but are not limited to, the number of layers in the neural network, choice of activation functions, inclusion of batch normalization layers, and regularization strength. It is noted that in the context of machine learning (ML), the regularization of a machine learned model refers to a penalty applied to the loss function of the machine learned model and should not be confused with the regularization of a seismic data set (a possible pre-processing step). Commonly, in the literature, the selection of hyperparameters surrounding a machine-learned model is referred to as selecting the model "architecture". Once a machine learned model type and hyperparameters have been selected, the machine learned model is trained to perform a task. In accordance with one or more embodiments, a machine learned model type and associated architecture are selected, the machine learned model is trained to perform video-processing to determine traffic environment image data, the performance of the machine learned model is evaluated, and the machine learned model is used in a production setting (also known as deployment of the machine learned model).

The operations performed by the environment interpretation engine (120) are described below in reference to the flowcharts. The environment interpretation engine (120) may be executed on a computer system, e.g., as described in reference to FIG. 6. In one embodiment, the computer system is an ECU of the motor vehicle.

The content augmentation engine (130), in one or more embodiments, receives the identified environmental objects (122) and determines an augmentation content (132), based on the environmental objects (122).

In one or more embodiments, augmentation content (132) includes any modification of an image frame, for subsequent displaying to a user. For example, augmentation content (132) may include a blurring, marking, highlighting, distorting, removing, moving, recoloring, animating, or any other modification of one or more of the identified environmental objects (122). Augmentation content (132) may further include the addition of any number of objects. An added object may be a static or a dynamic object. A static object may be an indicator (e.g., an arrow pointing at another object), whereas a dynamic object may be an object that changes its characteristics, e.g., shape, size, color, location, etc., over time, e.g., frame-by-frame. Such dynamic objects may include, for example, animated characters in video game applications, dynamically changing informational content, etc.

In one or more embodiments, the augmentation content (132) may be user-controllable, either directly or indirectly. A user input device (140) may enable a user to provide input device commands (142). For example, a user may provide steering commands to control position, orientation, movement, etc., of an object that is an element of the augmentation content (132). The control of augmentation content may be context-specific, may enable interaction within the augmentation content, etc. The user input device (140) allowing control over the augmentation content (132) may be a smartphone, a gaming console, a tablet, or similar device that enables a user to provide input. The user input device may communicatively interface with the computing device(s) (e.g., an ECU) of the motor vehicle using wired or wireless interfaces, such as WIFI, USB, etc. A more detailed discussion of different types of augmentation content and possible interactions with the augmentation content by one or more users is provided below in the discussion of various examples of possible applications.

The rendering engine (150), in one or more embodiments, receives the sensor data or image frame (112) and the augmentation content (132) and generates an augmented image frame (152). In preparation for displaying the augmented image frame (152), the rendering engine may perform an occlusion detection to render only pixels that are supposed to be visible. For example, when augmentation content (132) is present, the rendering engine (150) may generate an object mask which is then used to identify occlusion and render only desired pixels of the sensor data or image frame (112). In one or more embodiments, machine learned data is used to generate the object mask which in turn is used to identify occlusion and render only the desired pixels. A rendering engine (150) such as Unity or Unreal may be used.

The display (160), in one or more embodiments, is used to display the augmented image frame (152) to the user. The display (160) may be any type of display, for example, an in-vehicle screen, the display of a smartphone, tablet, or gaming device, etc. In one embodiment, the input device (140) and the display (160) are combined in a single device such as a smartphone, tablet, or gaming device.

The system (190) enables various implementations of VR and AR experiences. A few examples a subsequently provided.

Gaming Application: A 3D gaming world may be established based on the image frames captured by one or more of the cameras associated with the motor vehicle. In this case, the environment of the 3D gaming world is generated in real-time based on the actual environment surrounding the motor vehicle. In one specific example, a forward-facing camera of the motor vehicle may be used to capture video (a series of image frames). The video may be displayed to the user, along with various augmentations. The user may steer a cart in this environment, using a user input device. The 3D gaming world may include obstacles to be avoided (e.g., certain environmental objects or virtual objects added as augmentation content). The 3D gaming world may also include targets (e.g., virtual objects added as augmentation content).

The 3D gaming world may support a single user or multiple users for a multi-player experience. While the 3D gaming world is an AR application, a corresponding VR implementation may be provided by fully replacing all identified environmental objects with augmentation content. For example, the identified road may be rendered as an artificial road, the identified other vehicles may be rendered as vehicles in a different form, etc. In this configuration, the video itself may be excluded from the augmented image frames provided as output to the user. The described 3D gaming world may be operating in real-time (based on image frames that are processed in real-time, or in non-real-time (relying on previously recorded image frames).

Educational Application: An educational environment may be established based on the image frames captured by one or more of the cameras associated with the motor vehicle. The educational environment may be real-time or non-real-time. In one example, the educational application is used to teach traffic rules. For example, the educational application may teach a user the meaning of lane markings, traffic signs and how to perform certain maneuvers, such as changing lanes.

Entertainment: An entertainment environment may be established based on the image frames captured by one or more of the cameras associated with the motor vehicle. The entertainment environment may be real-time or non-real-time. In one example, the entertainment application is for children. Consider the daily drive from/to school. This drive is repetitive. In the example, a user (the child) may virtually pick a location (along the road) for growing virtual plants. The augmented reality experience provided to the user may include all aspects of the plant lifecycle from sowing seeds, to observing growth, harvesting, etc. The plants may also respond to care such as watering, fertilizing, etc. In another example, the environment may be turned into a Tetris or puzzle game environment that is based on the actual environment.

A system in accordance with embodiments of the disclosure may support any of these applications. A user may select from a desired application from a set of available applications, or an application may be specified by a third party. For example, a parent may select a particular application for a child.

While FIGS. 1A, 1B, and 1C show configurations of components, other configurations may be used without departing from the scope of the disclosure. For example, various components may be combined to create a single component. As another example, the functionality performed by a single component may be performed by two or more components. Various operations performed by the system may be performed on a computing system such as an ECU of the motor vehicle. At least some of these operations, e.g., the environment interpretation and the rendering may benefit from the availability of a graphics processing unit (GPU). Accordingly, the ECU or other computing system may be equipped with a GPU. Further, while not explicitly shown, the operations performed by the various components discussed in reference to FIGS. 1A and 1B may be performed locally or remotely, e.g., in the cloud environment (170).

FIG. 2 shows a flowchart of a method for augmented reality in automotive applications, in accordance with one or more embodiments.

Execution of one or more steps in FIG. 2 may involve one or more components of the system as described in FIG. 1. While the various steps in FIG. 2 are presented and described sequentially, one of ordinary skill in the art will appreciate that some or all of the steps may be executed in different orders, may be combined or omitted, and some or all of the steps may be executed in parallel. Furthermore, the steps may be performed actively or passively. The operations implementing the described steps may be represented by electronically-readable instructions, such as software code, firmware code, etc., which may be stored on one more non-transitory media.

In Step 202, sensor data are obtained. In one or more embodiments, the sensor data include an image frame obtained by a camera as previously described. In one or more embodiments, the camera is a fisheye camera. Step 202 may involve a pre-processing that is specific to the camera. For example, the image frame obtained from the camera may be pre-processed to eliminate distortions such as distortions typical for fisheye cameras. For example, a cropping of the image may be performed to obtain a rectangular image frame of the content of interest. Any other preprocessing such as brightness and/or contrast correction, compression, resizing, etc. may be performed. Additional sensor data from other sensors may be obtained as well, as previously described.

In Step 204, environmental objects are identified in the image frame. A series of image frames may be analyzed, for example, in order to detect motion. In one or more embodiments, as—based image processing is used for the identification of the environmental objects. For example, a deep learning-based image processing such as OmniDet, Single-Shot Deep MANTA, etc. may be used. A training may have been previously performed, e.g., based on surround-view fisheye data. The data set used for the training may be specific to the environment and may include elements typically encountered when driving a motor vehicle (e.g., buildings, roads, vehicles, bikes, animals, pedestrians, etc.) The resulting output of the machine learning-based image processing may include a depth estimation, a semantic segmentation, visual odometry, motion segmentation, and/or object detection of the environmental objects. For example, machine learned data from the image processing may be used to mark different segments in the image. This information may then be used to generate a navigation path for characters in scene. The output may be stored and/or forwarded as a description of the identified environmental objects. The description of the identified environmental objects may be linked to a frame number of the corresponding image frame for synchronization purposes. Additional detections may be performed, e.g., a detection of lens soiling. Examples of environmental objects that may be identified include, but are not limited to, roads, lane marks, curbs, persons, riders, vehicles, bicycles, motorcycles, and traffic signs.

In one or more embodiments, sensor data from other sensors, e.g., radar, Lidar or ultrasonic sensors may be used to improve the accuracy of the detections, the depth estimates, and/or the semantic segmentations, whereas GPS and IMU data may be used to determine an accurate estimate of the current vehicle position and/or orientation.

In Step 206, a post-processing of the identified environmental objects is performed. The post-processing may be performed in order to obtain data associated with the environmental objects in a format suitable for input to a rendering engine (e.g., as described in Step 210). The rendering engine may expect a description of the environmental objects as boundaries of these environmental objects. In contrast, the output of the operations of Step 204 may be pixel data. In Step 206, the necessary data manipulations are performed, in order to obtain boundaries. Examples of other issues addressed by the post-processing include, but are not limited to, false pedestrian clusters, disconnected pedestrian heads, pedestrians that include excess background, missed road surface detections, etc. The post processing may be performed for any of the identified environmental objects. A description of the post-processing of Step 206 is provided below in reference to FIG. 3.

The completion of Steps 204 and 206 results in a scene understanding with environmental object having been identified based on the performed object detection and classification, and further a depth map being available for the environmental objects, ensuring that their position, orientation, movement, etc. is known. This includes the identification of planes, e.g., horizontal planes established based on the road surface, vertical planes established based on detected walls or other structures, etc. The resulting scene understanding may govern possible movement in the VR/AR environment to be rendered as described below.

In Step 208 augmentation content is determined. Augmentation content to be added to the VR/AR environment to be rendered depends on the intended application of the VR/AR environment.

Augmentation content includes objects to be added, modification of content in the image frame by masking, etc.

Objects to be added include, for example e.g., one or more avatars, objects, symbols, labels, features, animated characters, text, etc. Objects may be static or dynamic. A dynamic object may be user controlled or may be controlled by the content augmentation engine (e.g., in case of a computer-controlled character (such as an adversary) moving in the AR/VR environment). Further, objects may change their behavior, e.g., based on context, contact, etc.

Masks for modifying content in the image frame include overlays (e.g., color filters, blurring filters, etc.), either non-transparent or partially transparent that may be static or dynamic (e.g., changing characteristics such color, contrast, flashing on/off, etc.)

Objects may be placed under consideration of the previously identified horizontal and vertical planes. For example, a horizontal plane may serve as a walkable area for a character, whereas a vertical plane may serve as a boundary. A character scaling and path planning may further be performed in order to generate navigation paths for characters. A* or any other path planning algorithm may be used, for example.

In one or more embodiments, the augmentation content is linked to a frame number of the corresponding image frame for synchronization purposes.

In Step 210, an augmented image frame is rendered based on the image frame and the augmentation content. In an AR environment, the rendering may be performed based on input including the image frame itself, the identified environmental objects, and the augmentation content. In a VR environment, the rendering may be performed based on input including the identified environmental objects, and the augmentation content. A description of the identified environmental objects may include a geometry, e.g., in the form of boundary pixels of each of the previously segmented objects (e.g., the ground, a person, a vehicle, etc.). Depth information may be included in the description. Similarly, a description of the augmentation content includes a geometry of the augmentation content. Input that may affect the rendering may further be received from the user. For example, the user may change the view to be rendered by a control command, by steering control movements, etc.

The rendering takes these inputs and generates pixel position points that can subsequently be used for mapping on a 2D scene to be displayed. In one or more embodiments, the rendering takes into consideration the geometry of the objects (environmental objects, augmentation content) to determine occlusion. Based on detected occlusions, an invisible mask based on the outline of the occluding geometry is determined, and the rendering is then performed only for the portion that is not occluded, based on the mask.

In one or more embodiments, the rendering ensures synchronization between the image frames, the description of the identified environmental objects, and the augmentation content. The synchronization may be performed based on frame numbers.

In Step 212, the augmented image frame is displayed, e.g., on a display of a user device such as a smartphone or tablet display, or a display of the motor vehicle. If the rendering is performed for multiple users, e.g., with different views, augmented image frames may be displayed on multiple displays.

Steps 202-212 may be performed in a loop, e.g., based on a fixed frame rate. This frame rate may correspond to the frame rate of the camera, or it may be different.

Figure 3:
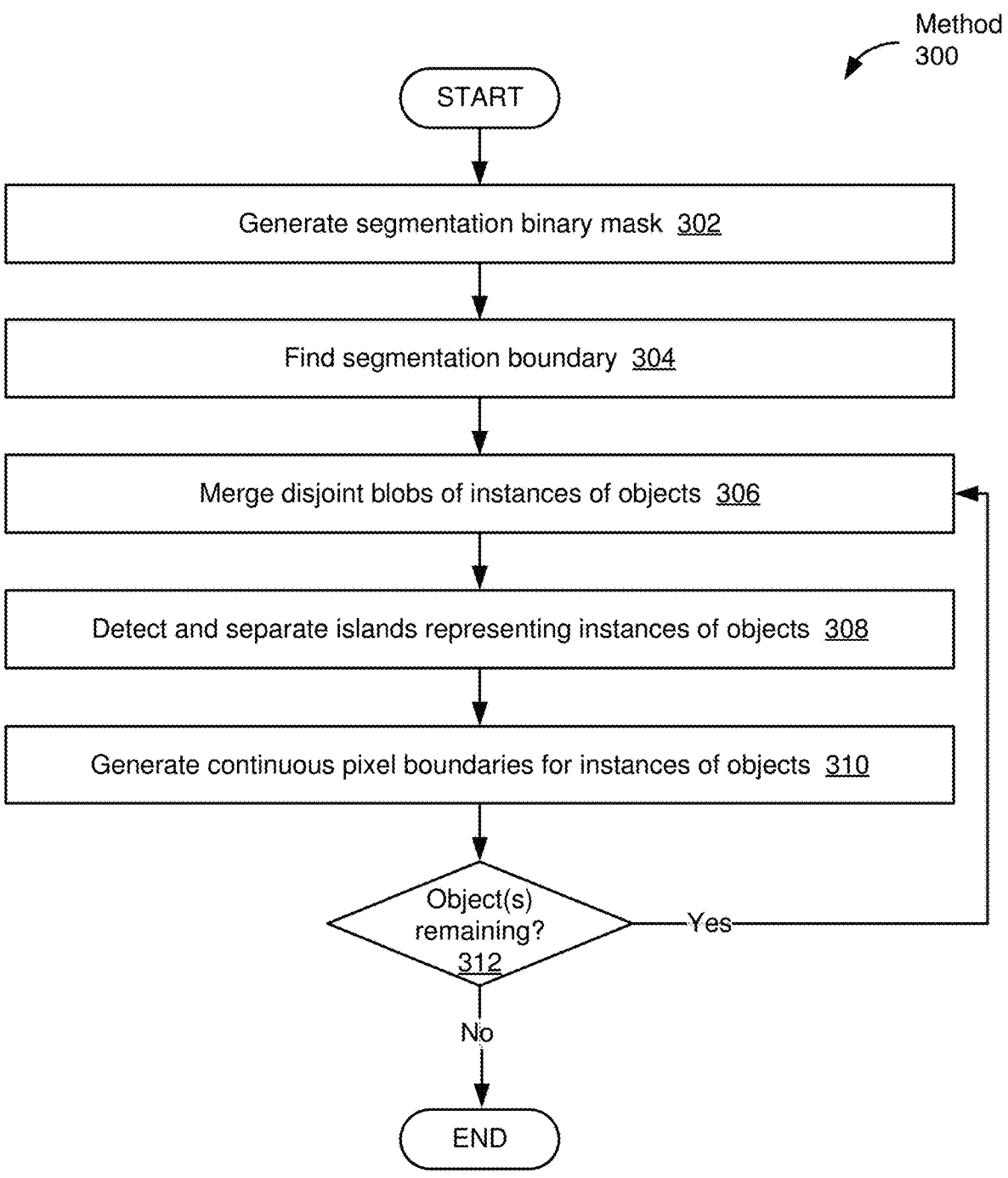
FIG. 3 shows a method (300) for post-processing identified environmental objects, in accordance with one or more embodiments.

FIG. 3 shows a method (300) for post-processing identified environmental objects, in accordance with one or more embodiments. For the execution of the method (300), assume that after execution of Step 204 of the method (200), a semantic segmentation of the image frame has been performed. The semantic segmentation may identify different pixels of the image frame as belonging to certain categories such as "pedestrian", "vehicle", etc.

Figure 4:
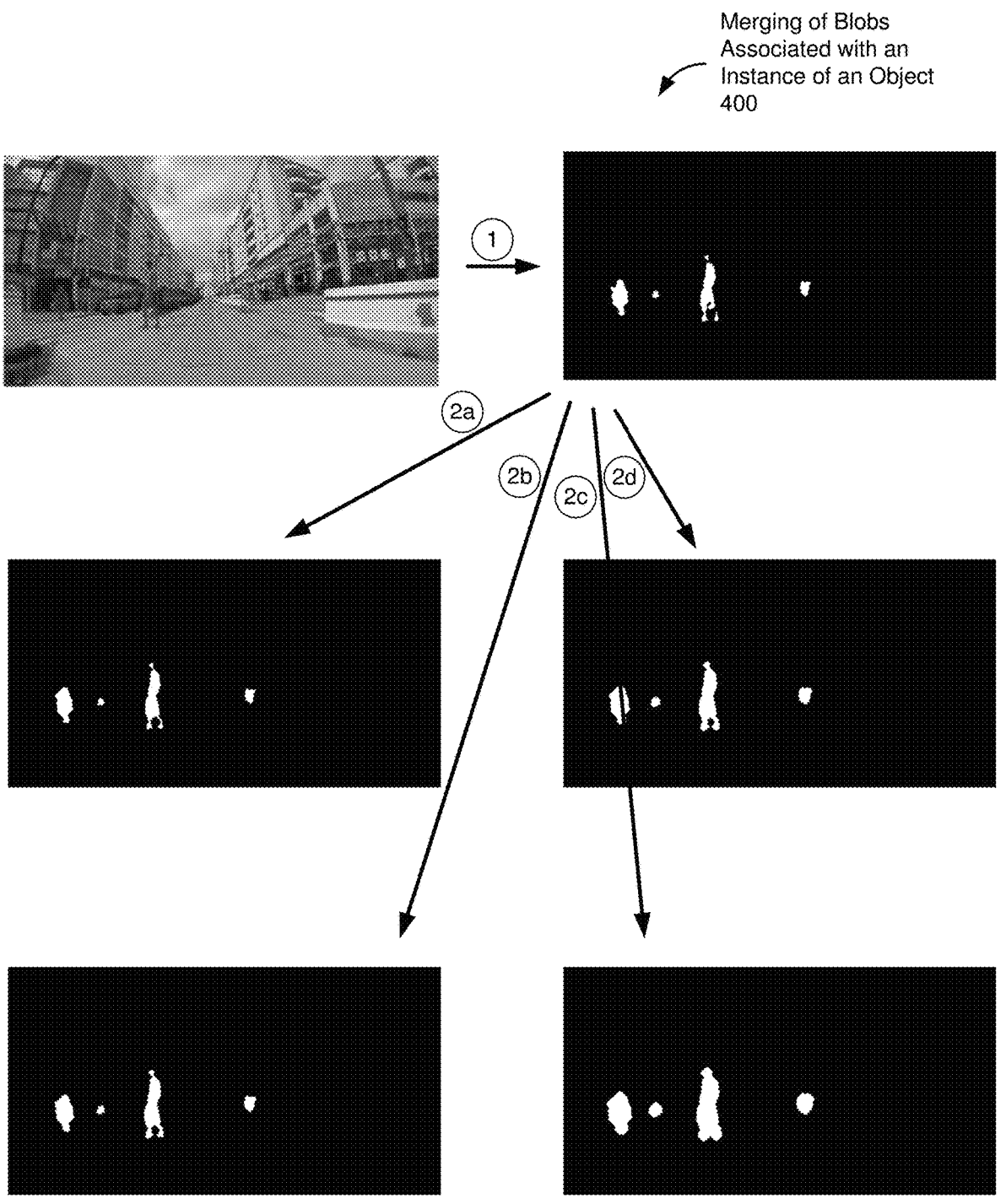
FIG. 4 shows an example of merging multiple blobs associated with a single environmental object into a single blob.

In Step 302, a segmentation binary mask is generated. The segmentation binary mask may directly reflect the result of the semantic segmentation performed in Step 204 of the method (200), after binarizing. Separate segmentation masks may be generated for different objects. An example of a segmentation binary mask for the object "pedestrian" is shown in FIG. 4.

In Step 304, a segmentation boundary is detected. The detection of boundary pixels may be performed using image processing and computer vision libraries such as "Skimage" or any other type of boundary detection algorithm. The detection of the segmentation boundary may be performed for each of the objects identified by the semantic segmentation. The detection of the segmentation boundary may be performed on the segmentation binary mask(s).

In Step 306, disjoint blobs of an instance of an object identified by the semantic segmentation are merged into a single blob, based on the boundary points obtained in Step 304. Morphological operations such as combinations of dilations and erosions may be used. The output may be a merged blob for each of the instances of the object(s) identified by the semantic segmentation. An example is provided in FIG. 4, as further discussed below. In addition, different objects may be combined to form a new object. For example, an object "road", and object "lane", and an object "curb" may be combined to a new object "ground" to form a horizontal surface. The availability of the object "ground" may be beneficial or essential for placement of other objects such as augmentation content.

In Step 308, islands representing instance of objects are detected and separated. The operation may be performed using the segmentation binary mask. An example is provided in FIG. 4 for the object of type "pedestrian". Four instances of an object "pedestrian" are present in the example. The operations of Step 308 ensure that the four pedestrians can be processed (e.g., tracked) individually rather than as a single object representing all four pedestrians. Stated differently, the example of FIG. 4 relates to an object of the type "pedestrian", and the operations of Step 308 ensure that all four instances of the object "pedestrian"

are accessible. The operations of Step 308 may be enabled by a dictionary that may have been generated based on the output of Step 204, where the different instances of the objects may have been detected and labeled.

In Step 310, continuous pixel boundaries are generated for the instances of the objects. While initially an instance of an object may be expressed by an unordered list of boundary pixels, the execution of the operations of Step 310 results in an ordered list. The ordered list may be generated using any method, such as a shortest path algorithm, a shortest and cheapest path algorithm, etc.

In one example of a pedestrian object, the starting point of the list of boundary pixels is the top of the head. Accordingly, the list of boundary pixels has the points in sequential order starting from the top of the head, then moving to the left shoulder, followed by more pixels on the left side, down to the left leg followed by the left foot, the right foot, moving up the right leg, the right side and then ending at the last pixel adjacent to the starting pixel, thereby completing the outline without any zig-zag like pattern. The resulting list of boundary pixels may be used as input to the rendering engine.

The generation of continuous pixel boundaries can be computationally demanding, and different methods may provide different frame rates for the same computational platform. For example, a graph based version (using the NetworkX library) produces 6 fps, a distance vector based version (using the Numpy library) produces 27 fps, and a distance matrix based version (using the Scipy library) produces 32 fps.

In Step 312, if additional types of objects exist, the previously described steps may be repeated, until the Steps of the method (300) have been completed for all types of objects.

FIG. 4 shows an example of the merging of multiple blobs associated with an instance of an object (400) into a single blob, in accordance with embodiments of the disclosure. An image for which a semantic segmentation has been performed is initially available. A segmentation binarized mask is obtained by binarizing the image frame as identified by arrow (1). In the example, the segmentation binarized mask is for an object of the type "pedestrian". Four instances of the object "pedestrian" are present, in the example.

The resulting representations of the instances in the segmentation binarized mask can be suboptimal, with single objects segmented into smaller, disjoint chunks. In the example, one instance of the object shows a head of a pedestrian that is not connected to the torso of the pedestrian. In other words, representation includes multiple disjoint blobs. As illustrated by arrows (2a, 2b, 2c, 2d), the smaller blobs may be combined to bigger blobs using morphological operations. Depending on the parameterization of the morphological operations (such as dilation and erosion operations), different results may be obtained.

FIG. 5 shows an example screenshot (500) in accordance with embodiments of the disclosure. The screenshot illustrates the coexistence of real and virtual objects in a possible application. Real static objects include the street, buildings, etc. Real dynamic objects include cars and pedestrians. Virtual objects (a cat and a runner) are inserted at plausible locations, i.e., in contact with the ground.

Figure 6:
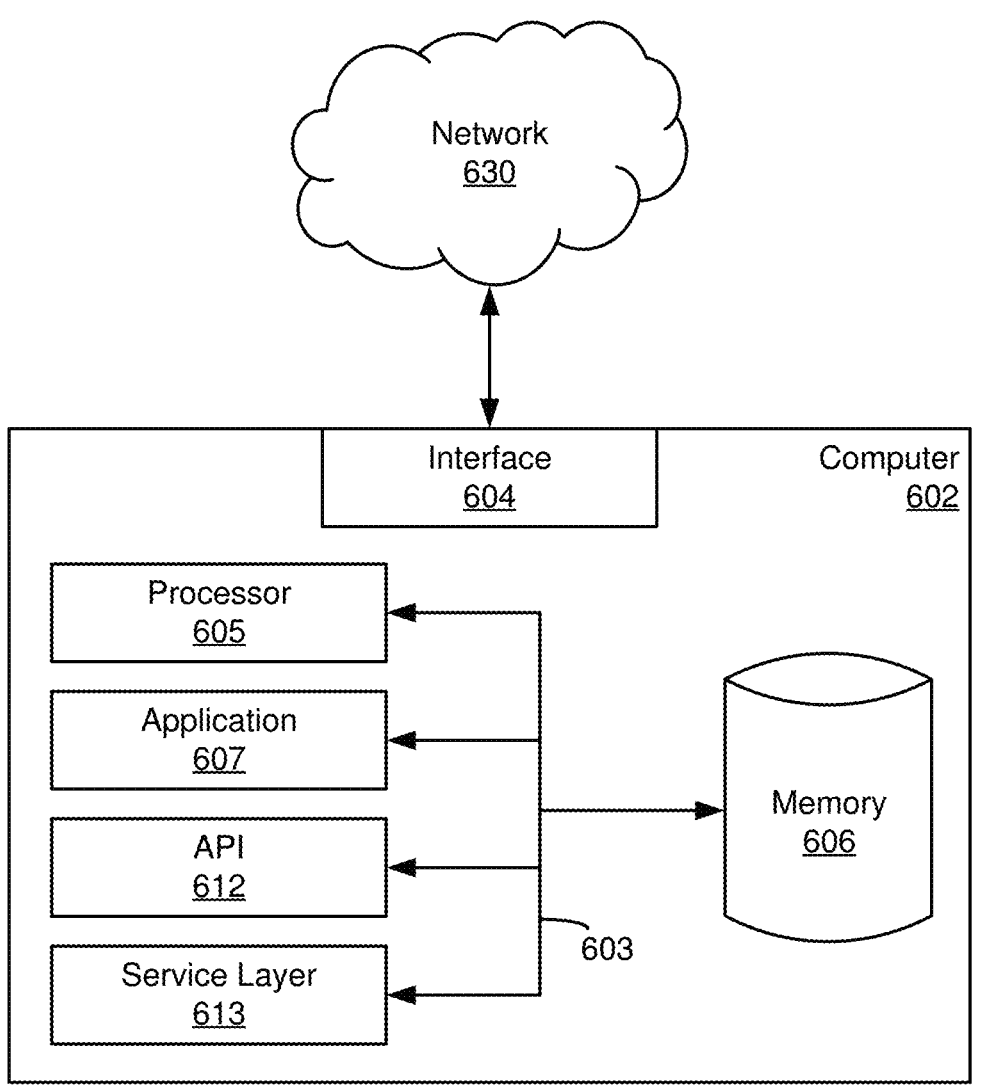
FIG. 6 shows a computer system, in accordance with embodiments of the disclosure.

FIG. 6 shows a computing system, according to one or more embodiments. Embodiments may be implemented on a computer system. FIG. 6 is a block diagram of a computer system (602) used to provide computational functionalities associated with described algorithms, methods, functions, processes, flows, and procedures as described in the instant disclosure, according to an implementation. The illustrated computer (602) is intended to encompass any computing device such as a high-performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environments (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or other suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604 includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing computer (602), each computer (602) communicating over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

In some embodiments, the computer (602) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Advantageously, embodiments disclosed herein allow for a real-time current environment based VR/AR experience while traveling inside a motor vehicle, without requirement in the movement of cameras to generate a scene that depicts or uses aspects of the environment surrounding the vehicle. Further, the solution disclosed herein does not make use of the SLAM (Simultaneous Localization and Mapping) techniques and does not require an actual 3D reconstruction (neither mesh nor voxels). This allows for less computational overhead and less storage requirements in order to render a VR/AR experience for a person inside the vehicle (or outside the vehicle as the case may be).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for augmented reality in automotive applications, the method comprising:

obtaining an image frame from a camera of a motor vehicle;

identifying at least one environmental object in the image frame;

for one of the automotive applications selected for execution:

providing, by a developer kit, the at least one identification of an environmental object to a content augmentation engine of the selected automotive application, the content augmentation engine configured to determine an augmentation content based on the at least one identification of the environmental object;

rendering an augmented image frame based on the image frame and the augmentation content received from the selected automotive application via the developer kit; and displaying the augmented image frame to a user, wherein the developer kit provides an interface for facilitating development of the automotive applications by third parties, and wherein the at least one identification of the at least one environmental object in the image frame comprises:

processing the image frame using machine learning-based image processing previously trained on traffic environment image data, and for an instance of one of the at least one environmental object, merging disjoint blobs associated with the instance,

wherein merging the disjoint blobs comprises performing dilation operations and erosion operations on the disjoint blobs.

2. The method of claim 1, wherein the image frame comprises an image of an environment external to the motor vehicle.

3. The method of claim 1, wherein the obtaining the image frame comprises a pre-processing specific to the camera.

4. The method of claim 3, wherein the camera is a fisheye camera, and wherein the pre-processing comprises cropping the image frame obtained from the fisheye camera.

5. The method of claim 1, wherein the at least one environmental object identified in the image frame comprises at least one selected from a group consisting of another motor vehicle, a bicycle, a motorcycle, a road, lane marks, a curb, a traffic sign, a building, an animal, and a pedestrian.

6. The method of claim 1, wherein the machine learning-based image processing comprises a semantic segmentation of the image frame.

7. The method of claim 1, wherein the identifying the at least one environmental object in the image frame further comprises:

for the at least one environmental object, generating at least one segmentation binary mask.

8. The method of claim 1, wherein the identifying the at least one environmental object in the image frame further comprises:

for a plurality of instances of one of the at least one environmental objects, separating the plurality of instances.

9. The method of claim 1, wherein the identifying the at least one environmental object in the image frame further comprises:

for an instance of one of the at least one environmental objects, generating a continuous pixel boundary.

10. The method of claim 1, wherein the determining the augmentation content comprises:

selecting at least one of an avatar, a symbol, a label, and an overlay for the rendering the augmented image frame.

11. The method of claim 10, wherein the augmentation content is controllable from a user input device.

12. A system for augmented reality in automotive applications, the system comprising:

an environment interpretation engine that identifies at least one environmental object in an image frame obtained from a camera of a motor vehicle;

a developer kit that provides an interface for facilitating development of the automotive applications by third parties, wherein:

when one of the automotive applications is selected for execution on the system, the developer kit is configured to:

provide the at least one identification of an environmental object to a content augmentation engine of the selected automotive application, the content augmentation engine configured to determine an augmentation content based on the at least one identification of the environmental object; and a rendering engine that renders an augmented image frame based on the image frame and the augmentation content received from the selected automotive application via the developer kit for display of the augmented image to a user, and

wherein, as part of the at least one identification of the at least one environmental object in the image frame, the environment interpretation engine is further configured to:

process the image frame using machine learning-based image processing previously trained on traffic environment image data, and for an instance of one of the at least one environmental object, merge disjoint blobs associated with the instance, wherein merging the disjoint blobs comprises performing dilation operations and erosion operations on the disjoint blobs.

13. The system of claim 12, wherein the selected automotive application is selected from the automotive applications based on a user input received by the system.

14. The system of claim 12, wherein the applications comprise at least one selected from a gaming application, an educational application, and an entertainment application.

15. The system of claim 12, further comprising:

a display that is one selected from a group consisting of a display of a portable user device and a display of the motor vehicle, wherein the display displays the augmented image frame.

16. The system of claim 12, further comprising:

a user input device for controlling the augmentation content by the user.

17. The system of claim 12, wherein the developer kit comprises an in-car instance and an in-cloud interface, wherein the in-car instance is operable in real-time, and wherein the in-cloud interface is configured to provide a developer interface.

18. A non-transitory computer readable medium (CRM) storing computer readable program code for augmented reality in automotive applications, wherein the computer readable program code causes a computer system to:

obtain an image frame from a camera of a motor vehicle;

identify at least one environmental object in the image frame;

for one of the automotive applications selected for execution:

provide, by a developer kit, the at least one identification of an environmental object to a content augmentation engine of the selected automotive application, the content augmentation engine configured to determine an augmentation content based on the at least one identification of the environmental object;

render an augmented image frame based on the image frame and the augmentation content received from the selected automotive application via the developer kit; and display the augmented image frame to a user, wherein the developer kit provides an interface for facilitating development of the automotive applications by third parties, and wherein the at least one identification of the at least one environmental object in the image frame comprises further causing the computer system to:

process the image frame using machine learning-based image processing previously trained on traffic environment image data, and for an instance of one of the at least one environmental object, merge disjoint blobs associated with the instance, wherein merging the disjoint blobs comprises performing dilation operations and erosion operations on the disjoint blobs.

\* \* \* \* \*